UNITED STATES PATENT OFFICE.

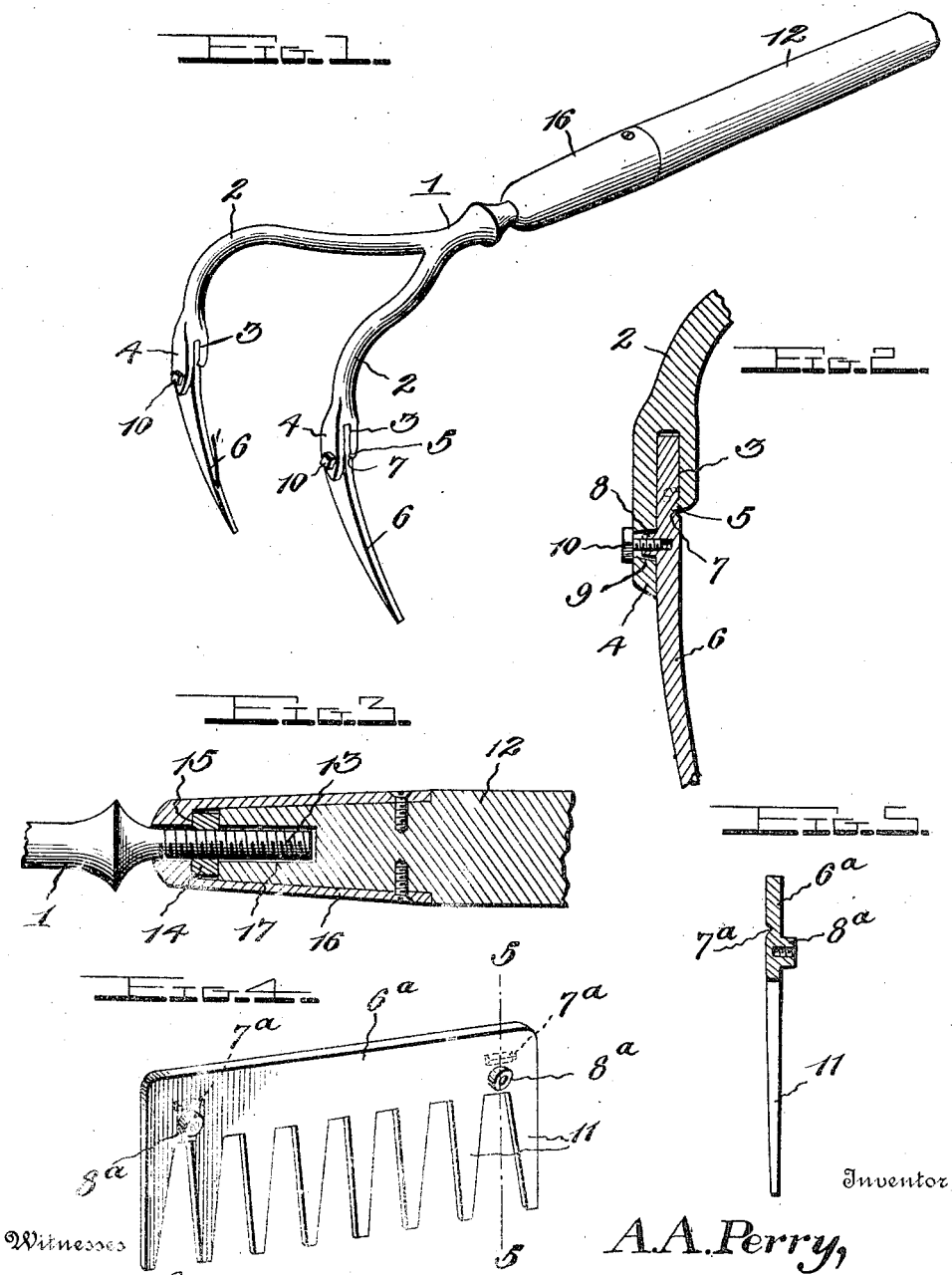

AMOS A. PERRY, OF PEARCY, ARKANSAS.

GARDEN-TOOL.

1,043,459.  Specification of Letters Patent.  Patented Nov. 5, 1912.

Application filed February 15, 1912. Serial No. 677,673.

*To all whom it may concern:*

Be it known that I, AMOS A. PERRY, a citizen of the United States, residing at Pearcy, in the county of Garland and State of Arkansas, have invented certain new and useful Improvements in Garden-Tools, of which the following is a specification, reference being had to the accompanying drawings.

This invention comprehends certain new and useful improvements in tools for use in the garden and in the field, and the invention has for its primary object a simple, durable and efficient construction of device of this character embodying a shank and a handle to which the shank is connected and the shank being so formed, in connection with the blades of the device, that the blades may be easily removed and others substituted therefor, whereby new blades may be easily inserted in place when the old blades wear out, and whereby also the character of the tool may be changed, as for instance, from a common garden hoe to a cotton hoe, or to a rake, or other similar tool.

With this and other objects in view as will more fully appear as the description proceeds, the invention consists in certain constructions, arrangements and combinations of parts that I shall hereinafter fully describe and claim.

For a full understanding of the invention reference is to be had to the following description and accompanying drawings in which:—

Figure 1 is a perspective view of one form or embodiment of my invention; Fig. 2 is a fragmentary or sectional view through one member of the forked shank and a blade secured therein, illustrating particularly the fastening means between the shank member and blade; Fig. 3 is a sectional view of the connecting means between the shank and the handle of the tool; Fig. 4 is a detail perspective view of a blade in the form of a rake; and Fig. 5 is a sectional view thereof on the line 5—5 of Fig. 4.

Corresponding and like parts are referred to in the following description and designated in the accompanying drawing by like reference characters.

My improved garden or field tool includes a shank 1 having a forked and preferably curved end 2, the members of the fork being divergent at any desired angle and formed with preferably flattened extremities which are transversely recessed as indicated at 3 to form downwardly facing blade receiving sockets. The forward member of each socket 3 is preferably extended down below the rear member thereof as clearly illustrated in Fig. 2 and indicated at 4, and the extremity of the rear member of each socket is formed with a forwardly projecting tooth 5. In that form of the invention illustrated in Figs. 1 and 2, separate and independent tapering blades 6 are held within the sockets 3. Each blade is formed on its rear face with a depression 7 in which the tooth 5 is designed to engage, and each blade is formed on its forward face with an interiorly threaded boss 8 which is received in an opening 9 extending through the forward member of the socket, below the tooth 5. Preferably the boss 8 is of a size to stop short of the front face of the shank member 2 at the opening 9. Clamping screws 10, preferably with polygonal heads, as shown, are entered in the respective openings 9 from the forward faces of the members 2, the threaded stems of said screws working in the threaded openings of the bosses 8, whereby, when said screws are tightened they will draw the blades 6 securely in the socket, and, in connection with the teeth 5, will rigidly hold the blades therein.

It is of course to be understood that my invention is not limited to the use of separate blades such as those indicated at 6 but that a continuous blade such as a hoe blade or a rake may be received in the sockets of the shank members 2 and held therein as hereinbefore described. For instance, one example of this is illustrated in Fig. 4, where the blade, there designated 6ª, is formed with teeth 11 whereby the tool may be used as a rake. The blade 6ª is formed with bosses 8ª corresponding to the bosses 8 before mentioned and on the opposite face with depressions 7ª corresponding to the before mentioned depressions 7. At this point it will be understood that by the construction and arrangement of parts hereinbefore described and illustrated in the correlated views of the accompanying drawing, the tool may be easily transformed from one kind of tool to another and when old blades wear out, new blades may be substituted therefor without throwing away the entire tool. Thus a considerable saving will be effected.

In order to secure the shank 1 to the handle 12 of the device, the shank is formed with a threaded end 13 which is adapted to work through a preferably round nut 14, the nut being held between an internal shoulder 15 of a ferrule 16 which is secured to the handle 12 as by screws or similar fastening devices, and the tapered extremity of the handle which extends down into the ferrule as best illustrated in Fig. 3. The tapered end of the handle is formed with a longitudinal opening 17 to accommodate the threaded end 17 of the shank 1. By this means the shank may be detached whenever necessary for the purposes of repair or the like.

From the foregoing description in connection with the accompanying drawing it will be seen that I have provided a very simple, durable and efficient construction of tool which will be adaptable for various kinds of work and which will last a long time, as the blades may, when worn out, be easily replaced by new ones.

In the appended claims where the term "head" is used, it is to be understood that such term comprises any device such as the single continuous blade 6ᵃ with its teeth 11, or separate and distinct blades such as those indicated at 6 as it is also to be understood that various changes may be made in the construction, arrangement and proportion of the parts without departing from the scope of the invention as defined in the appended claims.

Having now fully described my invention what I claim is:—

1. A tool of the character described embodying a handle, a forked shank secured to said handle, each member of the fork being formed at its extremity with a transversely extending recess constituting a downwardly facing socket, the front member of each socket extending down below the rear member thereof and the rear member of each socket terminating in a forwardly projecting tooth, the forward member of each socket being formed below said tooth with an opening extending therethrough, and a head adapted to be received in said sockets and formed with depressions adapted to receive the teeth of the sockets and with forwardly extending bosses of a size to extend partially through the said openings, the bosses being interiorly threaded, and threaded fastening devices projecting inwardly from the forward ends of said openings and engaging the threads of said bosses, for the purpose specified.

2. A tool of the character described, including a handle, a shank connected to said handle, the shank being formed with a forked end, the members of the fork being formed at their extremities with transversely extending recesses constituting sockets, one member of each socket being formed with a tooth and the other member with an opening extending therethrough, blades secured in said sockets and formed with depressions adapted to receive said teeth and with bosses projecting into said openings, and fastening members extending into said openings and working in said bosses.

In testimony whereof I hereunto affix my signature in the presence of two witnesses.

AMOS A. PERRY.

Witnesses:
J. A. McCLARD,
B. J. McVAY.